US008484014B2

(12) United States Patent
Liu et al.

(10) Patent No.: US 8,484,014 B2
(45) Date of Patent: Jul. 9, 2013

(54) RETRIEVAL USING A GENERALIZED SENTENCE COLLOCATION

(75) Inventors: Xiaohua Liu, Beijing (CN); Ming Zhou, Beijing (CN); Hao Wei, Beijing (CN); Jing Zhao, Beijing (CN); Matthew R. Scott, Beijing (CN); Long Jiang, Beijing (CN); Gang Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1176 days.

(21) Appl. No.: 12/362,428

(22) Filed: Jan. 29, 2009

(65) Prior Publication Data

US 2010/0114574 A1 May 6, 2010

Related U.S. Application Data

(60) Provisional application No. 61/110,892, filed on Nov. 3, 2008.

(51) Int. Cl.
   *G06F 17/30* (2006.01)
   *G06F 17/27* (2006.01)
   *G06F 17/21* (2006.01)

(52) U.S. Cl.
   USPC .......................... 704/9; 704/7; 704/8; 704/4

(58) Field of Classification Search
   USPC ................................ 704/4, 7, 9, 8
   See application file for complete search history.

(56) References Cited

U.S. PATENT DOCUMENTS

| 5,331,556 | A | * | 7/1994 | Black et al. ................ 704/9 |
|---|---|---|---|---|
| 5,696,962 | A | * | 12/1997 | Kupiec ........................ 1/1 |
| 5,873,660 | A | * | 2/1999 | Walsh et al. .............. 400/63 |
| 5,963,940 | A | * | 10/1999 | Liddy et al. ................. 1/1 |
| 7,031,911 | B2 | | 4/2006 | Zhou et al. |
| 7,293,015 | B2 | | 11/2007 | Zhou et al. |
| 7,454,345 | B2 | | 11/2008 | Sasaki et al. |
| 2002/0123994 | A1 | * | 9/2002 | Schabes et al. ............ 707/5 |
| 2002/0169595 | A1 | * | 11/2002 | Agichtein et al. ........... 704/9 |
| 2004/0006466 | A1 | * | 1/2004 | Zhou et al. .............. 704/251 |
| 2004/0059564 | A1 | * | 3/2004 | Zhou ....................... 704/4 |
| 2004/0059718 | A1 | * | 3/2004 | Zhou et al. ............... 707/3 |
| 2004/0059730 | A1 | * | 3/2004 | Zhou ....................... 707/4 |
| 2005/0125215 | A1 | * | 6/2005 | Wu et al. .................. 704/1 |
| 2005/0234953 | A1 | * | 10/2005 | Zhang et al. ............ 707/101 |
| 2005/0273318 | A1 | * | 12/2005 | Zhou et al. .............. 704/10 |
| 2006/0206313 | A1 | * | 9/2006 | Xu et al. ................. 704/10 |

(Continued)

OTHER PUBLICATIONS

Barlow, Michael and Ute Romer, "Extracting Collocations from Specialised Corpora," 2007 CL Workshop, United Kingdom, 1 page.

(Continued)

*Primary Examiner* — Pierre-Louis Desir
*Assistant Examiner* — Abdelali Serrou
(74) *Attorney, Agent, or Firm* — Perkins Coie LLP (57) ABSTRACT

A method and system for identifying documents relevant to a query that specifies a part of speech is provided. A retrieval system receives from a user an input query that includes a word and a part of speech. Upon receiving an input query that includes a word and a part of speech, the retrieval system identifies documents with a sentence that includes that word collocated with a word that is used as that part of speech. The retrieval system displays to the user an indication of the identified documents.

14 Claims, 7 Drawing Sheets

U.S. PATENT DOCUMENTS

2006/0290535 A1* 12/2006 Thiesson et al. ................ 341/22
2007/0010992 A1    1/2007 Hon et al.
2008/0040325 A1    2/2008 Sachs et al.
2008/0300857 A1* 12/2008 Barbaiani et al. ................ 704/4

OTHER PUBLICATIONS

Lin, Dekang, "Extracting Collocations from Text Corpora," First Workshop on Computational Terminology, Montreal, Canada, 1998, 7 pages, www.cs.ualberta.ca/~lindek/papers/compterm.ps [last accessed Jan. 29, 2009].

Seretan, Violeta and Eric Wehrli, "Collocation translation based on sentence alignment and parsing," TALN 2007, Toulouse, Jun. 5-8, 2007, 10 pages, http://www.latl.unige.ch/articles2008/TALN2007_VS_EW.pdf [last accessed Jan. 29, 2009].

Seretan, Violeta, "Collocation Extraction Based on Syntactic Parsing," Thesis Paper, Universite de Geneve, Jun. 9, 2008, 265 pages, http://doc.rero.ch/lm.php?url=1000,40,3,20080918145728-JU/these.pdf [last accessed Jan. 29, 2009].

Shimohata, Sayori et al., "Retrieving Collocations by Co-occurrences and Word Order Constraints," 1997, In Proceedings of ACL-EACL'97, pp. 476-481, http://www.aclweb.org/anthology-new/P/P97/P97-1061.pdf [last accessed Jan. 29, 2009].

PCT International Search Report for Application No. PCT/US2009/063057 filed Nov. 3, 2009, mailing date May 17, 2010, 3 pages.

Zukerman, I. et al., Lexical Query Paraphrasing for Document Retrieval, COLING 2002: 19th International Conference on Computational Linguistics, 2002, 7 pages.

Barr, C. et al., "The Linguistic Structure of English Web-Search Queries," In: Empirical Method in Natural Language Processing 2008, pp. 1021-1030, Oct. 2008.

Ntoulas, A. et al., "The Infocious Web Search Engine: Improving Web Searching Through Linguistic Analysis," In: International World Wide Web Conference, 2005, pp. 840-849.

* cited by examiner

RETRIEVAL USING A GENERALIZED SENTENCE COLLOCATION

CROSS REFERENCE TO RELATED APPLICATION

This application claims the benefit of U.S. Provisional Application No. 61/110,892, filed Nov. 3, 2008, and entitled "RETRIEVAL USING A GENERALIZED SENTENCE COLLOCATION," which is incorporated herein in its entirety by reference.

BACKGROUND

The Internet, and especially the World Wide Web ("web"), has made vast amounts of information available to users through their Internet browsers. Although this information is easily accessible to users, there is so much information that it presents problems as users try to identify what information is relevant to their needs. This problem has been referred to as the information explosion problem. Search engine services have been developed to help users find information that is relevant to their needs. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by crawling the web to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

While such general approaches to searching for information of interest are useful in many situations, they may present problems in certain situations. One such situation occurs when a person who is a native speaker of one language is looking for help when writing in another language. For example, a person who is native speaker of Chinese and who is writing a document in English may find it difficult to identify the most appropriate English word to express their intent. Although the person could submit a query to a search engine service to retrieve web pages with sentences that may provide some help in determining the appropriate word, the person may not even know any English words that are similar in meaning, which makes keyword searching difficult. For example, if the person wants to express that they are happy with life, the person may know that the sentence should have the words "I" and "life," but may not know that the words "enjoy" and "like" might be appropriate words for forming the sentences "I enjoy life" or "I like life." If the person submitted the query "I life" to a search engine service, the search results are likely to include references relating to an "iLife" software product, a definition of "life," life-skills training, and so on. Such results, however, are unlikely to include sample sentences that would help the person identify an appropriate word for expressing their meaning.

Another situation occurs when a person is searching for documents relating to a certain topic, but with a simple series of keywords that might not accurately express their intention. For example, a person who is researching sources of revenue for a governmental entity may want to compile a list of common names for different types of taxes, such as income tax, real estate tax, death tax, vehicle tax, sales tax, and so on. The person may submit the query "common names of taxes," which would seem to accurately describe the interest of the person. In that instance, search engine services are likely to return documents related to name and tax issues relating to common law marriages, a book on common and scientific names that is for sale at a price that includes tax, and so on. Such documents, however, would not be of interest to the person interested in the common names of taxes.

SUMMARY

A method and system for identifying documents relevant to a query that specifies a part of speech is provided. A retrieval system receives from a user input query that includes a word and a part of speech. Upon receiving an input query that includes a word and a part of speech, the retrieval system identifies documents with a sentence that includes that word collocated with a word that is used as that part of speech. The retrieval system displays to the user an indication of the identified documents. The retrieval system allows a user to use a part of speech as a wildcard as appropriate to specify their intent when inputting a query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for identifying documents relevant to a query that specifies a part of speech is provided. In some embodiments, a retrieval system receives from a user an input query that includes a word and a part of speech. For example, the input query may be specified as "(adjective) tax." This input query may represent a person's intention to look for common names of taxes, which typically have an adjective followed by the word "tax." The retrieval system uses the term "(adjective)" to represent a wildcard for any word that is used as an adjective before the word "tax". Upon receiving an input query that includes a word and a part of speech, the retrieval system identifies documents with a sentence that includes the specified word collocated with a word that is used as that part of speech. For example, the retrieval system may identify documents that contain the following sentences:

Most Americans pay their income tax on April 15.
Congress voted to limit the death tax.

The first sentence includes the adjective "income" collocated with the word "tax," and the second sentence includes the adjective "death" collocated with the word "tax." The retrieval system, however, would not identify documents based on the following sentences:

Many levels of government tax small businesses unfairly.
It is our obligation to pay upon his death tax for his estate.

Neither of these two sentences includes an adjective collocated with the word "tax." Although the words "government" and "death" could be used as adjectives in some contexts, both words are used as nouns in these sentences and are not adjectives describing the word "tax." As another example, a user may input the query of "I v. life," where "v." represents a wildcard for a word that is a verb. In such a case, the retrieval system searches for sentences in documents that contain the word "I" followed by a verb that is followed by the word "life." For example, the retrieval system may identify documents that contain the following sentences:

I enjoy life.
I like life.

In these two sentences, the words "enjoy" and "like" are verbs. The retrieval system may then display an indication of the identified documents to the user. In this way, a user can use a part of speech as a wildcard as appropriate to specify their intent.

In some embodiments, the retrieval system may be used to assist a person searching for a word when writing a document in other than their native language. For example, a person who is a native Chinese speaker may want to find an English verb to express their happiness with life. A native English speaker would know that the verbs enjoy and like might be appropriate verbs—however, a native Chinese speaker might not. The retrieval system allows a person to enter an input query that includes a part of speech as a wildcard and one or more words (e.g., "I v. life") and returns sentences that match that input query (e.g., "I enjoy life" and "I hate life"). The native Chinese speaker could then decide upon the appropriate verb based on the definition of the verb as inferred from the context surrounding the word in that sentence or from a dictionary.

In some embodiment, the retrieval system may generate a mapping of collocated words and parts of speech to aid in identifying sentences that match an input query. The retrieval system may process the sentences in a collection of sentences using a natural language processor to identify the parts of speech of the words within each sentence. For example, a natural language processor may identify the words of the sentence "I enjoy life" as a pronoun, verb, and noun, respectively. A natural language processor may initially determine the structure of each sentence by identifying the subject, predicate, object, and so on. The natural language processor may then identify the parts of speech of each word of the sentence based on the sentence structure. The part of speech of a word is considered a generalization of that word. The retrieval system then identifies pairs of collocated words within each sentence. For example, the sentence "I enjoy life" includes the collocated words (I, enjoy) and (enjoy, life). The retrieval system then generates two part of speech and word pairs for each pair of collocated words. For example, the retrieval system may generate the part of speech and word pairs of (pronoun, enjoy) and (I, verb) for the collocated words (I, enjoy) and the part of speech and word pairs of (verb, life) and (enjoy, noun) for the collocated words (enjoy, life). The retrieval system may create an index that includes an entry for each part of speech and word pair that is generated. Each entry identifies the sentences of the collection that include that part of speech and word pair. In this way, the retrieval system can quickly identify sentences that contain part of speech and word pairs that match an input query.

Figure 1:
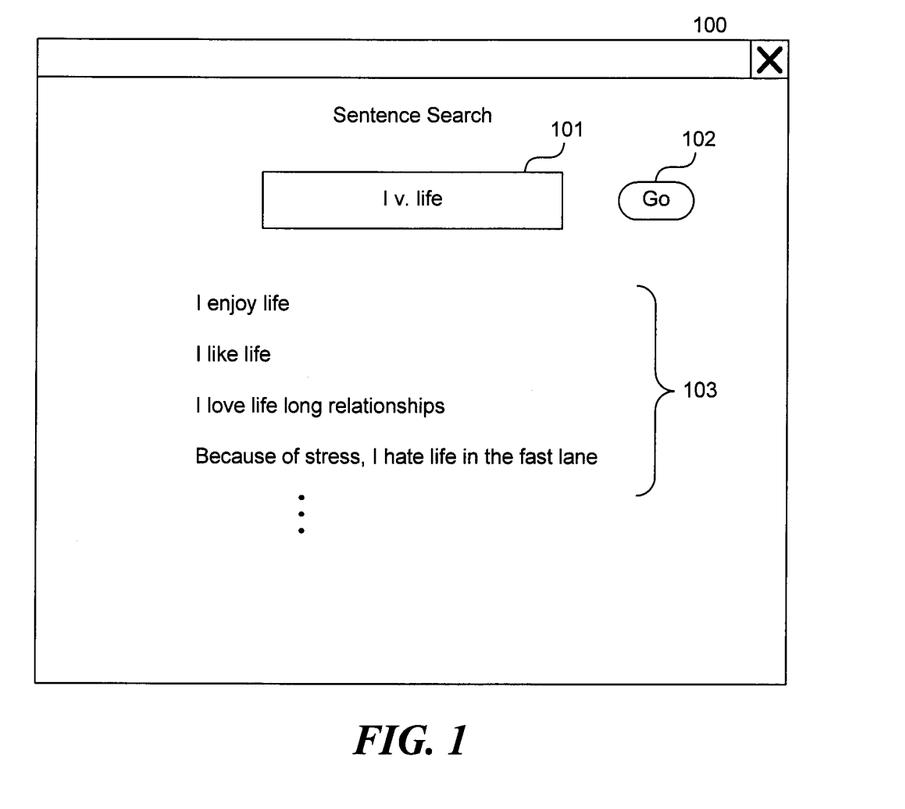
FIG. 1 is a display page that illustrates a sentence search using an input query that uses a part of speech as a wildcard in some embodiments of the retrieval system.

FIG. 1 is a display page that illustrates a sentence search using an input query that uses a part of speech as a wildcard in some embodiments of the retrieval system. Display page 100 includes an input query text box 101, a go button 102, and a results area 103. A user enters a query with a wildcard for a part of speech into the text box and selects the go button to submit the query. The retrieval system identifies sentences that match the query and displays the results in the results area. In this example, the user has input the query "I v. life" to search for sentences that include the word "I" followed by a verb and then the word "life." Each of the sentences in the results area matches the query using different verbs (i.e., enjoy, like, love, hate). In some embodiments, the retrieval system may allow the user to select a word from the results area to view a definition of the word. For example, if a user selects the word "enjoy," the retrieval system may display a definition of the word "enjoy." In some embodiments, the retrieval system may allow the user to select an entire sentence from the results area to view the sentence in the context of the document from which it was extracted (if any).

Figure 2:
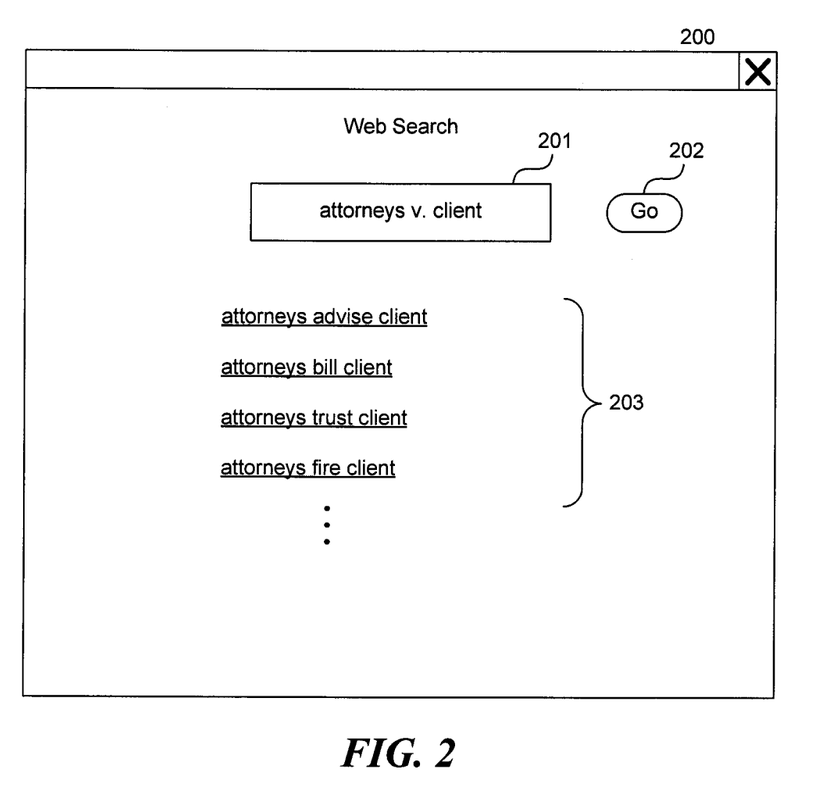
FIG. 2 is a display page that illustrates a web page search using an input query that uses a part of speech as a wildcard in some embodiments of the retrieval system.

FIG. 2 is a display page that illustrates a web page search using an input query that uses a part of speech as a wildcard in some embodiments of the retrieval system. Display page 200 includes an input query text box 201, a go button 202, and a results area 203. A user enters a query with a wildcard for a part of speech (e.g., "v.") into the text box and then submits the query. The retrieval system identifies web pages that contain sentences that match the query and displays links to the identified web pages in the results area. Each link may be identified by the phrase within the web page that matches the query. Each link may be further identified by additional context taken from the web page. In this example, the user has input the query "attorneys v. client" to search for sentences that include the word "attorneys" followed by a verb and then the word "client." Each of the web pages identified in the results area includes a sentence that matches the query using a different verb (i.e., advise, bill, trust, and fire).

In some embodiments, the retrieval system may rank the identified web pages based on their relevance to the query, popularity, importance, and/or some other measure. A user may select a link within the results area to view the web page that contains a sentence that matches in the query. The retrieval system may allow any part of speech to be used as a wildcard, such as adjective, adverb, conjunction, interjection, noun, preposition, pronoun, and verb. For example, a user may input the query "adj. tax" to search for an adjective followed by the word "tax." In some embodiments, the retrieval system may allow a user to specify within a query both a word and its part of speech. The retrieval system will search for sentences that include that word used as that part of speech. For example, the query of "building(n.)" will result in identification of sentences that include the word "building" as a noun, but not sentences that include the word "building" as a verb. The retrieval system may identify the sentence "The building is old," but not the sentence "The old are building relationships." Such a word and part of speech combination can be used to define complex queries such as "building(v.) house" to find web pages relating to constructing a house. In general, any search engine service can be adapted to include part of speech wildcards. For example, the search engine may be adapted to include a part of speech as another type of quantifier of a regular expression used to specify queries.

Figure 3:
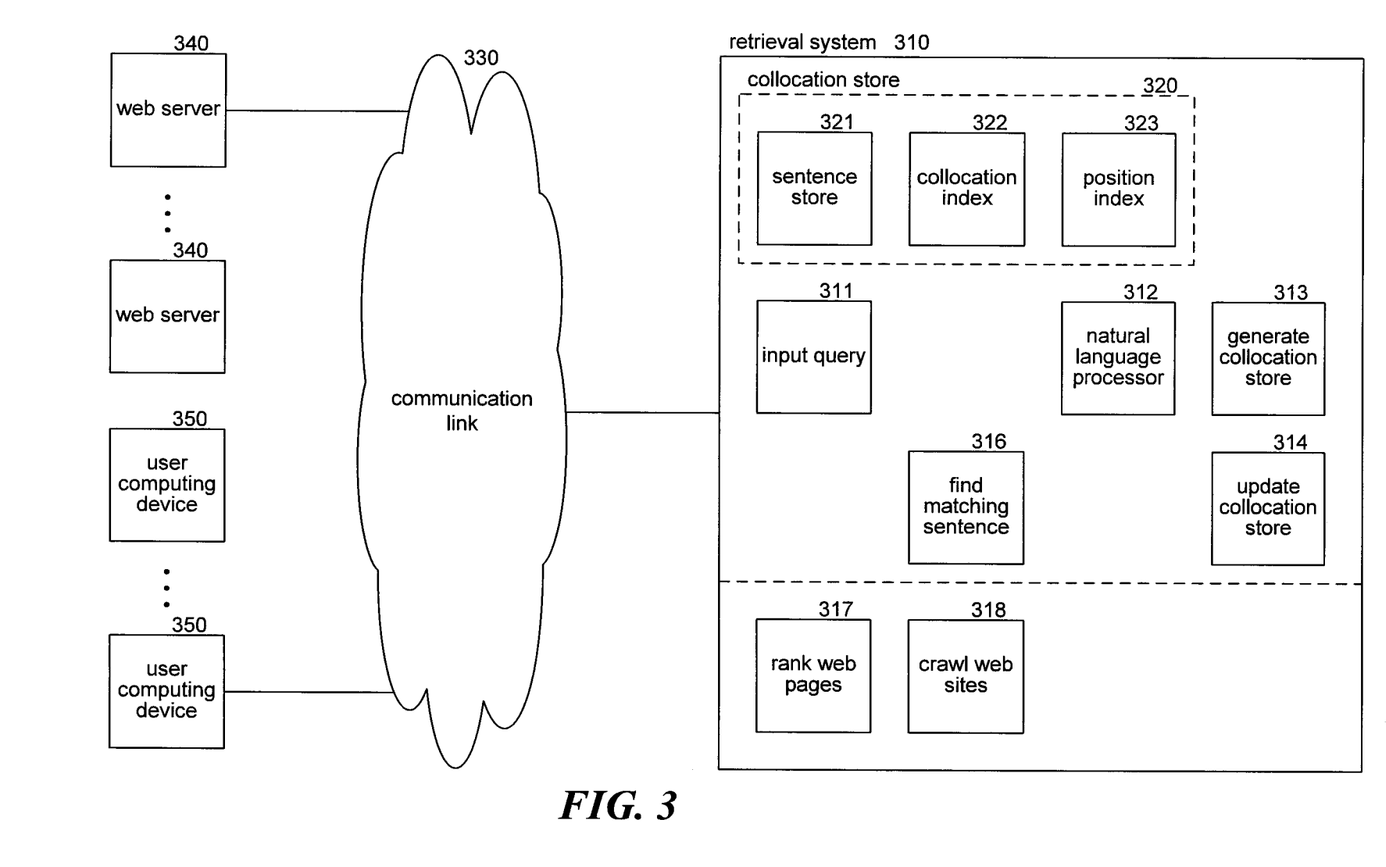
FIG. 3 is a block diagram that illustrates components of the retrieval system in some embodiment.

FIG. 3 is a block diagram that illustrates components of the retrieval system in some embodiments. The retrieval system 310 may be connected to web servers 340 and user computing devices 350 via a communication link 330. The retrieval system may include a collocation store 320, an input query component 311, a natural language processor component 312, a generate collocation store component 313, an update collocation store component 314, and a find matching sentence component 316. The retrieval system may also include a rank web pages component 317 and a crawl web sites component 318 when the retrieval system is used to search for web pages. The collocation store includes a sentence store 321, a collocation index 322, and a position index 323. The sentence store contains the sentences to be searched and the indexes provide a mapping of the parts of speech and word pairs of the sentences.

The generate collocation store component is used to populate the collocation store. The generate collocation store component selects each sentence of the sentence store and identifies the parts of speech and word pairs for the sentences using the natural language processor component. The generate collocation store component invokes the update collocation store component to update the collocation and position indexes. The input query component inputs from a user a query that includes a part of speech as a wildcard. The find matching sentence component finds the sentences within the sentence store that match the input query. The crawl web sites component crawls the various web sites and adds the sentences of the web pages to the sentence store along with a reference to the web page that contains that sentence. The rank web pages component generates a ranking of the web pages that contain sentences that match the input query.

Figure 4:
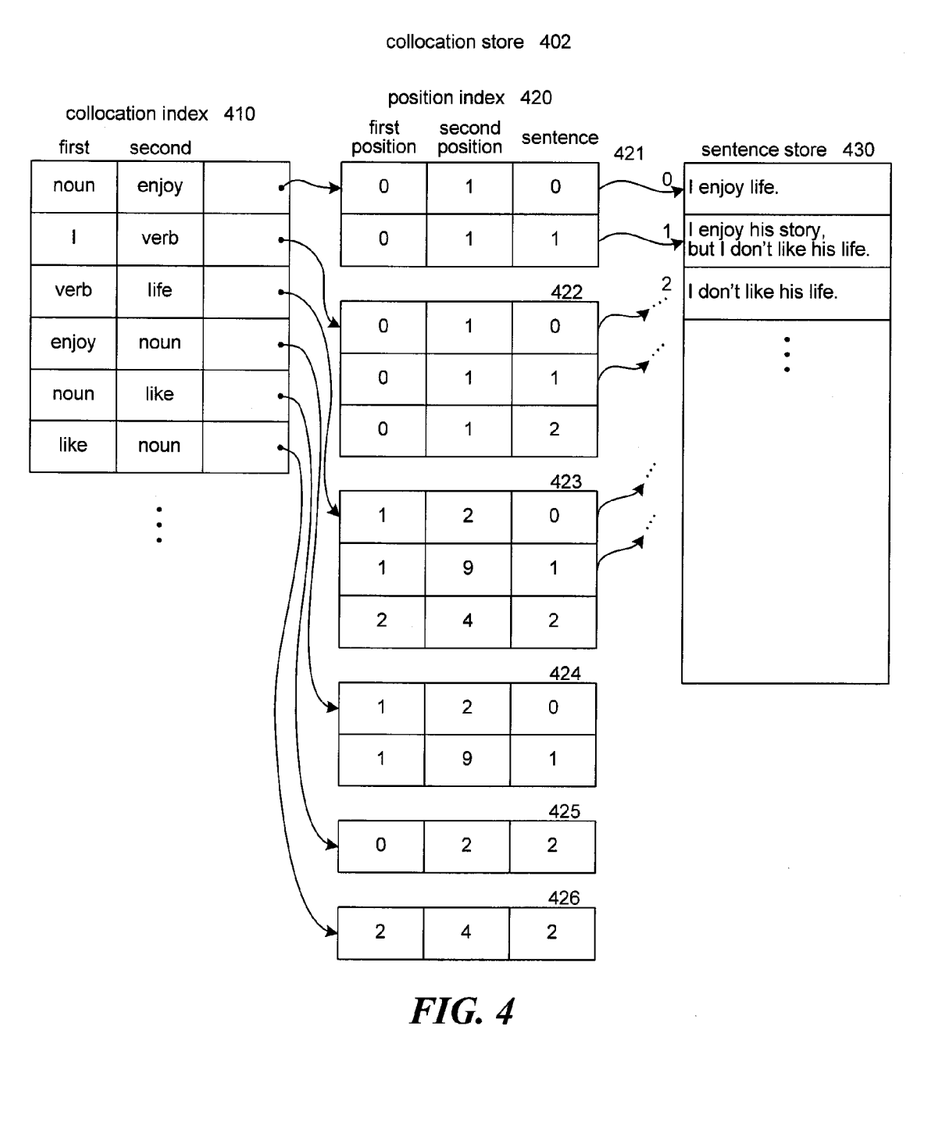
FIG. 4 is a block diagram illustrating components of a collocation store of the retrieval system in some embodiment.

FIG. 4 is a block diagram illustrating components of a collocation store of the retrieval system in some embodiments. The collocation store 402 includes a collocation index 410, a position index 420, and a sentence store 430. The collocation index contains an entry for each part of speech and word pair identified from the sentence store. In this example, the collocation index includes the parts of speech and word pairs of (noun, enjoy), (I, verb), (verb, life), (enjoy, noun), (noun, like), and (like, noun). Each entry of the collocation index identifies the first and second terms of the pair and contains a reference to a position index 420. For example, the entry of (noun, enjoy) contains a reference to the position index 421. Each entry of the position index identifies the position of the first term of the word pair within the sentence and the position of the second term of the pair within that sentence. Each entry also contains a reference to the corresponding sentence. For example, the third entry in the position index 422 indicates that the word (i.e., "like") at the second position in sentence 2 is a verb and that the word (i.e., "life") at the fourth position in sentence 2 is "life." (Note: The first word in sentence may be considered at position 0, the second word may be considered at position 1, and so on.)

To find sentences that match a query such as "I v. life," the retrieval system generates the parts of speech and word pairs (I, verb) and (verb, life). The retrieval system then uses the collocation index to find the set of sentences that include (I, verb) and the set of sentences that include (verb, life). The retrieval system then takes the intersection of the sets of sentences as those sentences that contain both (I, verb) and (verb, life). In some embodiments, the retrieval system may allow a query to specify that the verb in (I, verb) and (verb, life) should represent the same verb or may represent a different verb. For example, the query "I v. life" may indicate that the user wants the verb to represent the same verb, whereas the query "I v. & v. life" may indicate that the user does not care if the verbs are different.

In some embodiments, the retrieval system may consider any pair of words within the same sentence to be a pair of collocated words irrespective of whether they are adjacent. For example, the sentence "I enjoy life" has the collocated words of (I, enjoy), (I, life), and (enjoy, life). The position index identifies the positions of each word in a collocated pair within a sentence. For example, the positions for these collocated words are (0, 1), (0, 2), and (1, 2). The retrieval system may use the positions to identify when a wildcard represents the same word. For example, the positions (0, 1) and (1, 2) for (I, verb) and (verb, life) for sentence 1 indicates that the verb is the same since both verbs are at position 1. In contrast, the positions (0, 1) and (7, 9) for (I, verb) and (verb, life) for sentence 2 indicates that the verb is not the same since position 1 and position 7 are different.

The computing device on which the retrieval system is implemented may include a central processing unit, memory, input devices (e.g., keyboard and pointing devices), output devices (e.g., display devices), and storage devices (e.g., disk drives). The memory and storage devices are computer-readable storage media that may be encoded with computer-executable instructions that implement the retrieval system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the retrieval system may be implemented in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The retrieval system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the retrieval system may be implemented on a server that provides a user interface to a user computing device for searching for sentences. Alternatively, the retrieval system may be implemented on each user computing device. Also, the generating of the collocation store can be performed on a server and then downloaded to the user computing devices to assist in searching for sentences.

Figure 5:
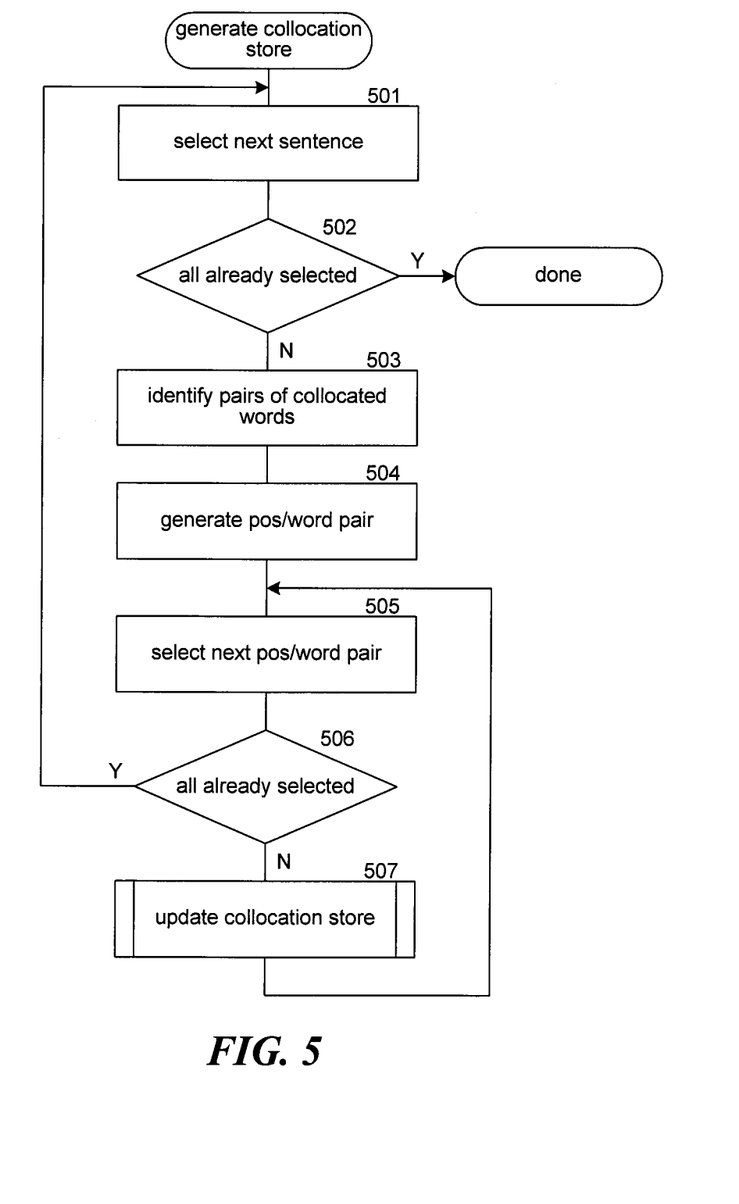
FIG. 5 is a flow diagram that illustrates the processing of the generate collocation store component of the retrieval system in some embodiments.

FIG. 5 is a flow diagram that illustrates the processing of the generate collocation store component of the retrieval system in some embodiments. The component processes each sentence of the sentence store to populate the collocation and position indexes. In block 501, the component selects the next sentence of the sentence store. In decision block 502, if all the sentences have already been selected, then the component completes, else the component continues at block 503. In block 503, the component identifies pairs of collocated words within the selected sentence. In block 504, the component generates part of speech and word pairs for the collocated words. The component may invoke a natural language processor to identify the structure of the sentence and then the parts of speech of the words of the sentence. In blocks 505-507, the component loops adding each part of speech and word pair to the collocation store. In block 505, the component selects the next part of speech and word pair. In decision block 506, if all the part of speech and word pairs have already been selected, then the component loops to block 501 to select the next sentence, else the component continues at block 507. In block 507, the component invokes the update collocation store component and then loops to block 505 to select the next part of speech and word pair.

Figure 6:
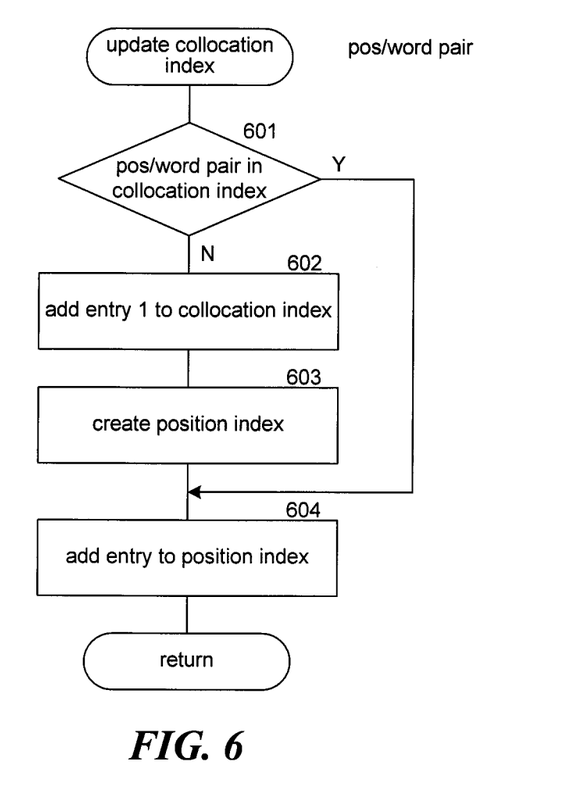
FIG. 6 is a flow diagram that illustrates the processing of the update collocation index component of the retrieval system in some embodiments.

FIG. 6 is a flow diagram that illustrates the processing of the update collocation index component of the retrieval system in some embodiments. The component is passed a part of speech and word pair and updates the collocation index and position index. In decision block 601, if the part of speech and word pair is already in the collocation index, then the component continues at block 604, else the component continues at block 602. In block 602, the component adds an entry to the collocation index. In block 603, the component creates a position index corresponding to the new entry in the collocation index. In block 604, the component adds an entry to the position index and then returns.

Figure 7:
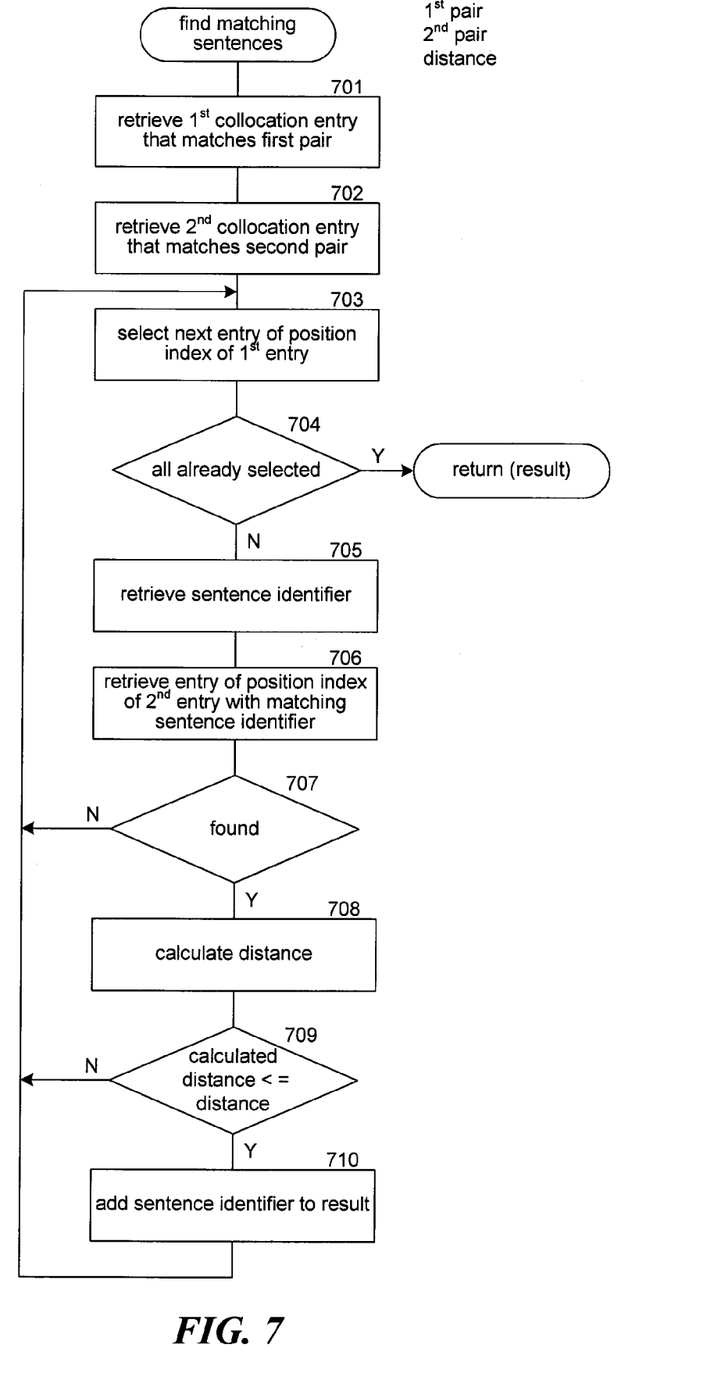
FIG. 7 is a flow diagram that illustrates the processing of the find matching sentences component of the retrieval system in some embodiments.

FIG. 7 is a flow diagram that illustrates the processing of the find matching sentences component of the retrieval system in some embodiments. The component is passed a first pair with a wildcard as its second element, a second pair with a wildcard as its first element, and a distance. The component identifies sentences that match the first pair and the second pair and whose wildcard are within the specified distance. A distance of 0 indicates that the wildcard represents the same word within the sentence. In block 701, the component retrieves a first collocation entry from the collocation index that matches the first pair. In block 702, the component retrieves the second collocation entry from the collocation index that matches the second pair. In blocks 703-710, the component loops determining whether any sentences identified by the first collocation entry and also identified by the second collocation entry (i.e., intersection of sentences) satisfy the distance. In block 703, the component selects the next entry of the position index of the first collocation entry. In decision block 704, if all the entries of that position index have already been selected, then the component returns the result, else the component continues at block 705. In block 705, the component retrieves the sentence identifier from the selected entry of the position index. In block 706, the component retrieves an entry of the position index of the second collocation entry with a matching sentence identifier. In decision block 707, if a entry with a matching sentence identifier is retrieved, then the component continues at block 708, else the component loops to block 703 to select the next entry of the position index. In block 708, the component calculates the distance between the part of speech and word pairs represented by the entries. In decision block 709, if the calculated distance is less than or equal to the passed distance, then the component continues at block 710, else the component loops to block 703 to select the next entry of the position index. In block 710, the component adds the sentence identifier to the result and then loops to block 703 to select the next entry of the position index.

Although the subject matter has been described in language specific to structural features and/or methodological acts, it is to be understood that the subject matter defined in the appended claims is not necessarily limited to the specific features or acts described above. For example, the sentences displayed to a user may be ranked based on several characteristics such as readability. As another example, an input query may include multiple parts of speech as wildcard. For example, an input query may be "adv. adj. work" that might be matched by the phrase "really hard work." In general, a sentence may be considered as a document that contains only one sentence. Rather, the specific features and acts described above are disclosed as example forms of implementing the claims. Accordingly, the invention is not limited except as by the appended claims.

We claim:

1. A method in a computing device for searching for sentences, the method comprising:
   providing a collection of sentences;
   for each sentence in the collection,
      identifying by the computing device pairs of collocated words of the sentence;
      for each identified pair of collocated words,
         identifying by the computing device a part of speech of each word of the pair;
         generating a first part of speech and word pair that includes the identified part of speech of the first word and the second word and a second part of speech and word pair that includes the first word and the identified part of speech of the second word; and
         generating a mapping from the first part of speech and word pair and the second part of speech and word pair for the sentence;
   receiving an input query that includes a first word, a part of speech, and a second word;
   identifying from the mapping sentences that include the first word of the input query collocated with a word with the part of speech of the input query and a word with the part of speech collocated with the second word of the input query; and
   displaying to a user the identified sentences.

2. The method of claim 1 wherein the identifying of sentences includes identifying a sentence such that the same word with the part of speech of input query is collocated with both the first word and the second word of the input query.

3. The method of claim 1 wherein the mapping includes an entry for each unique part of speech and word pair that identifies sentences that contain collocated words with that part of speech and word pair.

4. The method of claim 3 wherein each entry of the mapping identifies a position of the part of speech and a position of the word within each sentence that contains collocated words.

5. The method of claim 1 wherein the identifying of a part of speech of a word within a sentence includes invoking a natural language parser.

6. The method of claim 1 including ranking the identified sentences based on readability and displaying the sentences in an order base on their ranking.

7. The method of claim 1 wherein when the input query includes multiple parts of speech identifying sentences that include each of the multiple parts of speech collocated with a word of the input query.

8. A computer-readable storage medium that is not a signal containing instructions for controlling a computing device to identify documents relevant to a query, by a method comprising:
- receiving from a user an input query that includes a word and a part of speech, the part of speech representing a wildcard for any word that is that part of speech;
- identifying documents with a sentence that includes the word collocated with any word of that part of speech, the document being identified based on mappings from part of speech and word pairs to documents, the mappings generated by:
  - identifying collocated words of sentences of the documents; and
  - for each identified pair of collocated words of a sentence,
    - identifying a part of speech of each word of the pair;
    - generating a first part of speech and word pair that includes the identified part of speech of the first word and the second word and a second part of speech and word pair that includes the first word and the identified part of speech of the second word; and
    - generating a mapping from the first part of speech and word pair and the second part of speech and word pair to the document that contains the sentence;
- ranking the identified documents; and
- displaying to the user the identified documents in order of their rankings.

9. The computer-readable storage medium of claim 8 wherein the documents are web pages identified by crawling web sites.

10. The computer-readable storage medium of claim 9 wherein the ranking of the documents includes ranking web pages based on the relevance of sentences to the input query.

11. A computing device for identifying sentences having words of a designated part of speech, comprising:
- a component that inputs from a user a query having a word and a part of speech, the part of speech representing a wildcard for any word that is that part of speech;
- a component that identifies sentences that have the word of the query collocated with any word used as the part of speech of the query, the sentences being identified based on mappings from part of speech and word pairs to sentences, the mappings having been generated by a component that:
  - identifies collocated words of sentences; and
  - for each identified pair of collocated words of a sentence,
    - identifies a part of speech of each word of the pair;
    - generates a first part of speech and word pair that includes the identified part of speech of the first word and the second word and a second part of speech and word pair that includes the first word and the identified part of speech of the second word; and
  - generates a mapping from the first part of speech and word pair and the second part of speech and word pair to the sentence; and
- a component that displays to the user the identified sentences.

12. The computing of claim 11 wherein the word of the query and the word used as the part of speech are different words.

13. The computing device of claim 11 including a component that ranks the sentences and wherein the sentences are displayed in an order based on their ranking.

14. The computing device of claim 11 including a component that generates a mapping of collocated words and their parts of speech for sentences that contain them.

* * * * *